Patented June 19, 1928.

1,673,805

UNITED STATES PATENT OFFICE.

ELMER ANSON DANIELS, OF BERWYN, AND HARRY STIRLING SNELL, OF CHICAGO, ILLINOIS, ASSIGNORS TO WESTERN ELECTRIC COMPANY, INCORPORATED, OF NEW YORK, N. Y., A CORPORATION OF NEW YORK.

HARDENING RESINOUS EXUDATIONS WITH AMINONAPHTHALENE.

No Drawing.    Application filed August 21, 1924. Serial No. 733,444.

This invention relates to improved compositions of matter and methods of producing the same.

Objects of the invention are to produce an improved composition of matter having a resinous exudation as its base and to provide a method for producing the improved composition.

These objects are accomplished by incorporating with a resinous exudation, preferably shellac, a suitable amount of an aminonaphthalene, and then causing a condensation of the shellac with the aminonaphthalene added thereto. The two materials may be incorporated in a number of ways, but good results are obtained by dissolving the shellac in alcohol and then adding the hardening agent either alone or dissolved in alcohol or other solvent to the resulting solution.

In order to bring about the condensation, the alcohol is removed by evaporation and the residue subjected to sufficient heat to cause a condensation to take place therein. The reaction is hastened by the use of pressure, and where articles are to be formed from the material, the pressure can be employed for the purpose of hastening the reaction, and at the same time molding the article which is to be produced. Although several aminonaphthalenes can be employed in this manner to cause a hardening of the shellac, it is preferable to use the compound alpha-naphthylamine, as this material is easily obtained and gives good results.

Different proportions of this compound may be employed but for ordinary purposes, particularly when fillers are incorporated with the shellac, about 1% of the hardening agent is satisfactory.

Hardened shellac produced in this manner may be employed as a binder for a variety of materials, and in each case the amount of binder used will depend upon the filler employed and also upon the properties which are desired in the completed article.

As an example, wood flour may be incorporated with hardened shellac for the purpose of producing a compound which can be used as a substitute for wood or other materials, particularly where the articles to be hardened are small. A suitable mixture employing hardened shellac and wood flour which has been found to give good results may have the following proportions: shellac, 50 pounds; denatured alcohol, 15 gallons; alpha-naphthylamine, 0.5 pounds; and wood flour, 300 pounds. After all of the ingredients have been added the mixture is agitated until there is a thorough dispersion of the ingredients, after which the mass is spread out and thoroughly dried to insure the removal of all of the alcohol. The composition is then in the form of a dry powder which can be molded by heat and pressure into whatever shape is desired. Good results are obtained by carrying on the molding operation under a pressure of 2000 pounds per square inch while a temperature of from 260° F. to 270° F. is maintained for about ten minutes, the time and temperature depending to some extent upon the size of the article which is being formed. The composition is allowed to cool while still under pressure and when a sufficiently low temperature has been reached to permit handling, the pressure is removed. The article produced in this manner is resistant to alcohol and remains relatively hard at temperatures considerably above that at which shellac begins to soften.

Cork may also be used as the filling material and the relative proportions of the ingredients can be changed considerably depending upon the quality of the article desired. A cork composition may be produced in this manner, by following the same general process which is disclosed in our copending application, Serial No. 724,950, filed July 9, 1924.

What is claimed is:

1. A composition of matter formed by the condensation of a resinous exudation and an aminonaphthalene.

2. A composition of matter formed by the condensation of a resinous exudation and alpha-naphthylamine.

3. A composition of matter formed by the condensation of shellac and an aminonaphthalene.

4. A composition of matter formed by the condensation of shellac and alpha-naphthylamine.

5. A method of hardening a resinous exudation, which consists in adding thereto an aminonaphthalene, and heating.

6. A method of hardening a resinous exudation, which consists in adding thereto an aminonaphthalene, and then subjecting the resulting mixture to heat and pressure.

7. A method of hardening a resinous exudation, which consists in adding alpha-naphthylamine thereto, and then heating.

8. A method of hardening a resinous exudation, which consists in adding alpha-naphthylamine thereto, and then subjecting the resulting mixture to heat and pressure.

9. A method of hardening shellac, which consists in adding thereto an aminonaphthalene, and heating.

10. A method of hardening shellac, which consists in adding thereto an aminonaphthalene, and then subjecting the resulting mixture to heat and pressure.

11. A method of hardening shellac, which consists in adding alpha-naphthylamine thereto, and then heating.

12. A method of hardening shellac, which consists in adding alpha-naphthylamine thereto, and then subjecting the resulting mixture to heat and pressure.

In witness whereof, we hereunto subscribe our names this 16 day of August, A. D., 1924.

ELMER ANSON DANIELS.
HARRY STIRLING SNELL.